United States Patent
Kajikawa

(10) Patent No.: US 7,928,681 B2
(45) Date of Patent: *Apr. 19, 2011

(54) DISK APPARATUS CAPABLE OF DETERMINING FAILURE OF SPINDLE MOTOR

(75) Inventor: Kazuki Kajikawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 587 days.

This patent is subject to a terminal disclaimer.

(21) Appl. No.: 11/935,505

(22) Filed: Nov. 6, 2007

(65) Prior Publication Data

US 2008/0106815 A1    May 8, 2008

(30) Foreign Application Priority Data

Nov. 7, 2006 (JP) .................................. 2006-301761

(51) Int. Cl.
*G05B 23/02* (2006.01)
(52) U.S. Cl. ........ 318/565; 318/376; 318/560; 318/563; 360/31; 360/69; 361/23; 361/29; 361/30; 361/33; 361/110; 369/44.22; 369/100
(58) Field of Classification Search .................. 318/376, 318/565; 361/23, 29, 30, 33, 110; 360/31, 360/69; 369/44.22, 100
See application file for complete search history.

(56) References Cited

U.S. PATENT DOCUMENTS

| | | | |
|---|---|---|---|
| 6,011,902 A | | 1/2000 | Yamamoto |
| 6,107,926 A | * | 8/2000 | Kifuku et al. .................. 340/650 |
| 6,512,346 B2 | * | 1/2003 | Yoshimura .................... 318/599 |
| 7,053,676 B2 | * | 5/2006 | Kranz ............................ 327/108 |
| 7,342,371 B2 | * | 3/2008 | Zuzuly et al. .................. 318/434 |
| 7,656,625 B2 | * | 2/2010 | Kajikawa ........................ 361/29 |
| 2006/0087774 A1 | * | 4/2006 | Bielesch ........................ 361/23 |
| 2008/0266700 A1 | * | 10/2008 | Kajikawa et al. ............... 360/69 |

FOREIGN PATENT DOCUMENTS

| | | |
|---|---|---|
| JP | 8-310414 | 11/1996 |
| JP | 10-14280 | 1/1998 |
| JP | 2006-230068 | 8/2006 |

OTHER PUBLICATIONS

Patent Abstracts of Japan, Publication No. 08-310414 dated Nov. 26, 1996, 1 page.
Office Action issued in Japanese Patent Application No. 2006-301761 mailed Sep. 14, 2010, and English translation thereof, 4 pages.
English Patent Abstract and machine translation of JP10014280 from espacenet, published Jan. 16, 1998, 1 page.
English Patent Abstract and machine translation of JP2006230068 from espacenet, published Aug. 31, 2006, 1 page.
SA5694—Hangzhou Silan Microelectronics Joint-Stock Co., Ltd., "Actuator Driver With Current Feedback For CD—ROM/DVD." Rev. 2.1. May 21, 2005, pp. 1-9.

* cited by examiner

*Primary Examiner* — Walter Benson
*Assistant Examiner* — Kawing Chan
(74) *Attorney, Agent, or Firm* — Osha Liang LLP

(57) ABSTRACT

A control portion instructs supply of an offset voltage while a disk remains stopped at the time of start. While the disk remains stopped at the time of start, a differential operational amplifier detects a voltage difference between a first voltage supply line and a second voltage supply line. When the absolute value of the voltage difference output by the differential operational amplifier is equal to or lower than a prescribed threshold value, a failure determination portion determines that a spindle motor has shorted out.

4 Claims, 6 Drawing Sheets

DISK APPARATUS CAPABLE OF DETERMINING FAILURE OF SPINDLE MOTOR

BACKGROUND OF THE INVENTION

1. Field of the Invention

The present invention relates to a disk apparatus and more particularly to a disk apparatus detecting occurrence of short of a spindle motor.

2. Description of the Background Art

In a disk apparatus including a motor for rotating a disk by means of a spindle, a brush (electrode) within the motor wears and debris thereof is produced, which may lead to short of a commutator within the motor. If the commutator shorts out, rotation of the spindle motor stops and hence rotation of the disk stops. When rotation of the disk stops, a control portion such as a CPU (Central Processing Unit) in the disk apparatus attempts to increase a rotation speed of the spindle motor by increasing an output current of a drive IC (Integrated Circuit) driving the motor, and the drive IC generates heat due to a large current. Then, the drive IC malfunctions due to heat generation, a large current flows through an actuator which is a movable portion in a pickup unit in the disk apparatus, and a cover or the like of the actuator may burn. In addition, when rotation of the disk stops, the control portion cannot obtain a normal signal relevant to focusing and tracking. Accordingly, improper control of the drive IC by the control portion leads to a large current flow from the drive IC to the actuator which is a movable portion in a pickup unit in the disk apparatus, and a cover or the like of the actuator may burn.

Japanese Patent Laying-Open No. 08-310414 discloses an electric power steering apparatus capable of ensuring safety of a driver by reliably detecting short-circuiting or break of a signal harness, through which a detection voltage for monitoring a motor current passes, and contact failure of a connector, and by making transition to manual steering. Specifically, motor current monitoring means for monitoring a current that flows through a steering motor and outputting a detection voltage obtained by adding a prescribed offset voltage to a voltage in accordance with the current value is provided. The detection voltage from the motor current monitoring means is compared with predetermined upper limit threshold value and lower limit threshold value. If the detection voltage is out of a range from the upper limit threshold value to the lower limit threshold value, such a condition is detected as abnormal, and subsequent assist power control is prohibited.

Japanese Patent Laying-Open No. 08-310414, however, does not disclose a configuration for appropriately detecting occurrence of short of a motor for rotating a disk.

SUMMARY OF THE INVENTION

An object of the present invention is to provide a disk apparatus capable of appropriately detecting occurrence of short of a motor for rotating a disk.

A disk apparatus according to the present invention includes: a DC motor for rotating a disk utilizing a voltage difference generated between a positive terminal and a negative terminal; a control portion instructing supply of an offset voltage for driving the DC motor, the control portion instructing supply of the offset voltage while the disk remains stopped at the time of start; a drive portion having a first terminal connected to the positive terminal via a first voltage supply line and a second terminal connected to the negative terminal via a second voltage supply line and driving the DC motor by applying the offset voltage instructed by the control portion across the first terminal and the second terminal; a detector detecting a voltage difference between the first voltage supply line and the second voltage supply line while the disk remains stopped at the time of start; and a determination portion determining that the DC motor has shorted out when an absolute value of the voltage difference output by the detector is equal to or lower than a prescribed threshold value; and the detector is a differential operational amplifier having a first input terminal connected to the first voltage supply line and a second input terminal connected to the second voltage supply line, and the control portion displays occurrence of short when it is determined that the DC motor has shorted out, and thereafter turns off a power supply of the disk apparatus.

In addition, a disk apparatus according to the present invention includes: a DC motor for rotating a disk utilizing a voltage difference generated between a positive terminal and a negative terminal; a control portion instructing supply of an offset voltage for driving the DC motor, the control portion instructing supply of the offset voltage while the disk remains stopped at the time of start; a drive portion having a first terminal connected to the positive terminal via a first voltage supply line and a second terminal connected to the negative terminal via a second voltage supply line and driving the DC motor by applying the offset voltage instructed by the control portion across the first terminal and the second terminal; a detector detecting a voltage difference between the first voltage supply line and the second voltage supply line while the disk remains stopped at the time of start; and a determination portion determining that the DC motor has shorted out when an absolute value of the voltage difference output by the detector is equal to or lower than a prescribed threshold value.

Preferably, the detector is a differential operational amplifier having a first input terminal connected to the first voltage supply line and a second input terminal connected to the second voltage supply line.

Preferably, the control portion displays occurrence of short when it is determined that the DC motor has shorted out, and thereafter turns off a power supply of the disk apparatus.

According to the present invention, occurrence of short of the motor can be detected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings.

(Configuration)

Figure 1:
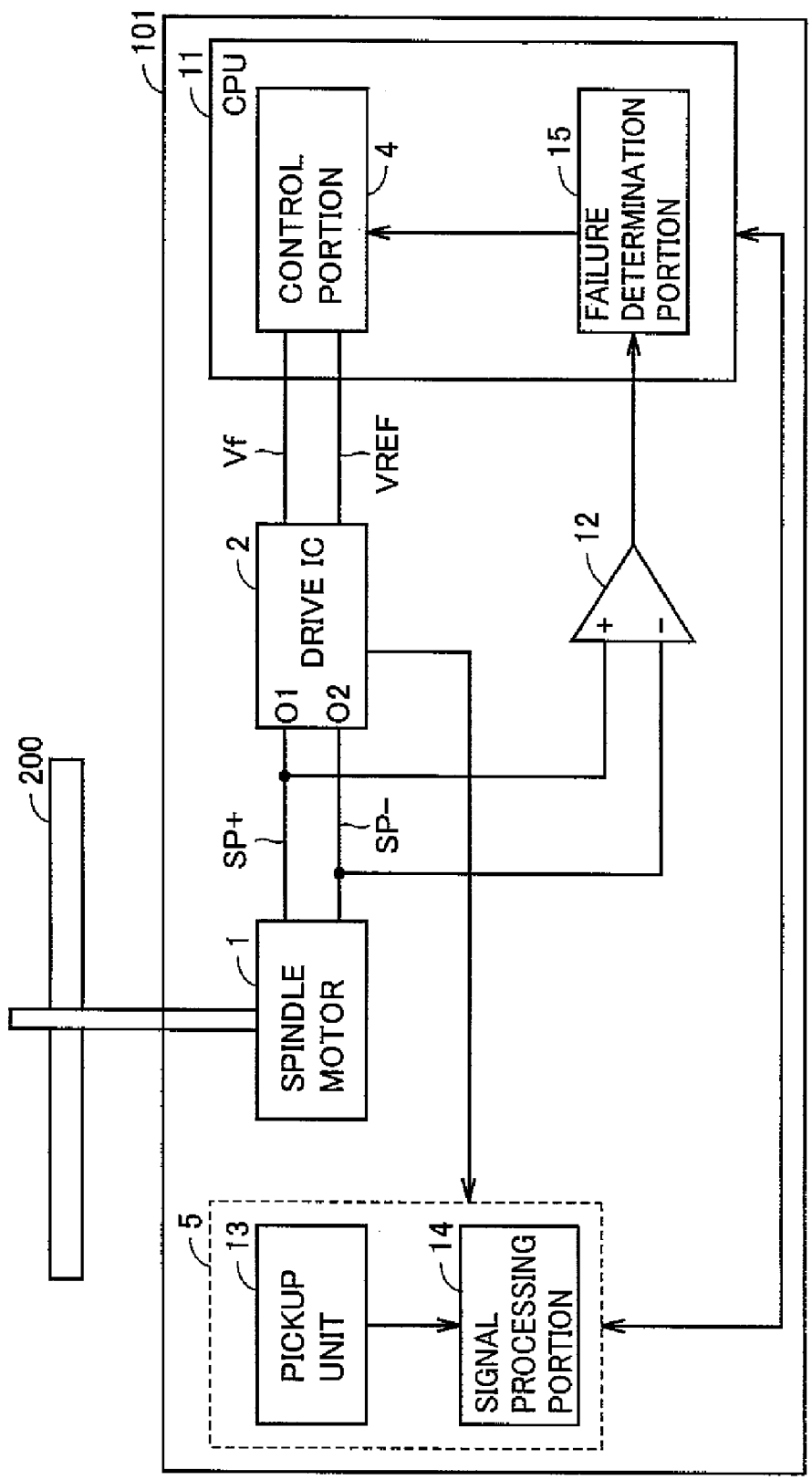
FIG. 1 is a functional block diagram showing a configuration of a disk apparatus in an embodiment of the present invention.

FIG. 1 is a functional block diagram showing a configuration of a disk apparatus in an embodiment of the present invention.

Referring to FIG. 1, a disk apparatus 101 includes a spindle motor 1, a drive IC (drive portion) 2, an operational amplifier 12, a disk reproduction portion 5, and a CPU (Central Processing Unit) 11. Disk reproduction portion 5 includes a pickup unit 13 and a signal processing portion 14. CPU 11 includes a control portion 4 and a failure determination portion 15.

For example, a CD (Compact Disk) or a DVD (Digital Versatile Disk) represents a disk 200.

Spindle motor 1 rotates disk 200 by its rotation based on an offset voltage received from drive IC 2.

Disk reproduction portion 5 reads data from disk 200 and reproduces disk 200 based on the read data. More specifically, pickup unit 13 includes a not-shown actuator for focusing and tracking. In addition, pickup unit 13 reads data from disk 200 by irradiating the surface of disk 200 with laser beams while scanning in a radial direction of disk 200 and by converting reflected light to electric signals. Signal processing portion 14 performs processing for reproducing disk 200 by subjecting the read data received from pickup unit 13 to demodulation processing, decoding processing, and the like. In addition, signal processing portion 14 outputs a signal representing a rotation state of disk 200 to control portion 4.

CPU 11 controls each portion in disk apparatus 101. CPU 11 includes control portion 4 and failure determination portion 15.

Control portion 4 controls each portion in disk apparatus 101. Control portion 4 notifies drive IC 2 of a voltage VREF which is a reference voltage based on the signal representing the rotation state of disk 200 received from pickup unit 13 during reproduction and while disk 200 remains stopped at the time of start, and instructs supply of an offset voltage Vf representing deviation from the reference voltage for driving spindle motor 1.

Figure 2A:
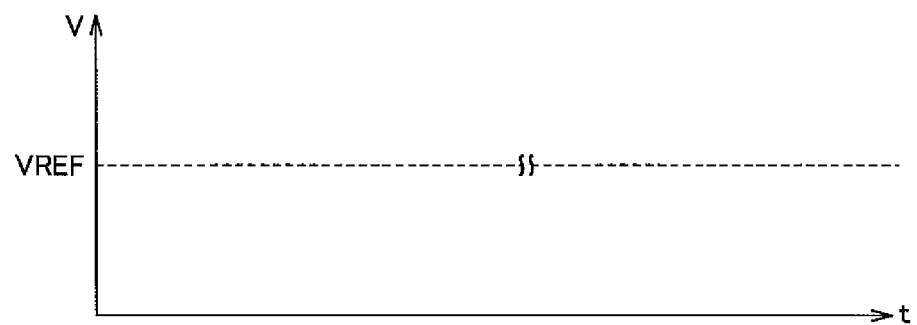
FIG. 2A illustrates a reference voltage notified of a drive IC by a control portion during reproduction of a disk.

FIG. 2A illustrates voltage VREF notified of drive IC 2 by control portion 4 during reproduction of disk 200.

Figure 2B:
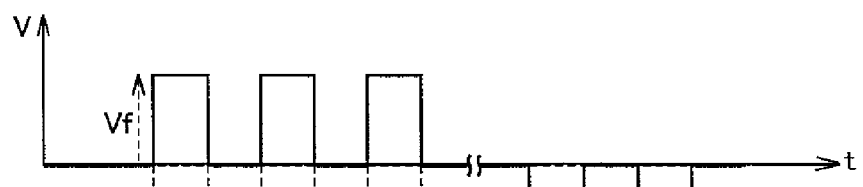
FIG. 2B illustrates an offset voltage of which supply is instructed to the drive IC by the control portion during reproduction of the disk.

FIG. 2B illustrates offset voltage Vf of which supply is instructed to drive IC 2 by control portion 4 during reproduction of disk 200.

Referring again to FIG. 1, drive IC 2 has a first terminal O1 and a second terminal O2. Drive IC 2 sets voltages of first terminal O1 and second terminal O2 based on voltage VREF and offset voltage Vf instructed by control portion 4. Specifically, a voltage obtained by adding a voltage resulting from dividing offset voltage Vf into half to voltage VREF is set for first terminal O1 and a voltage obtained by subtracting a voltage resulting from dividing offset voltage Vf into half from voltage VREF is set for second terminal O2.

The voltage set at first terminal O1 is sent to spindle motor 1 via first voltage supply line SP+ and the voltage set at second terminal O2 is sent to spindle motor 1 via second voltage supply line SP−.

Figure 2C:
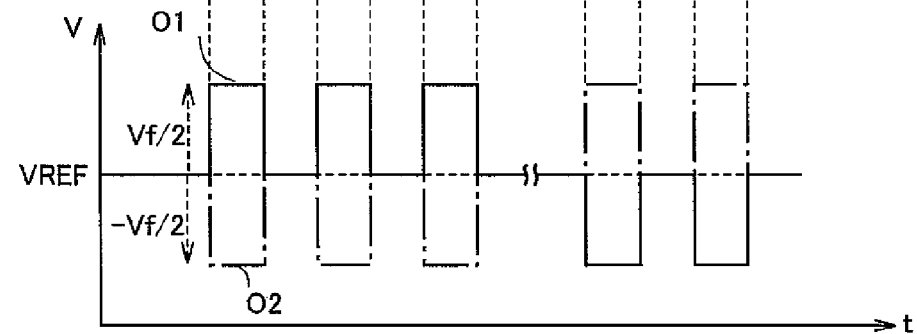
FIG. 2C illustrates voltages set at a first terminal and a second terminal of the drive IC when the reference voltage in FIG. 2A and the offset voltage in FIG. 2B are instructed.

FIG. 2C illustrates voltages set at first terminal O1 and second terminal O2 of drive IC 2 when voltage VREF in FIG. 2A and offset voltage Vf in FIG. 2B are instructed.

Figure 3:
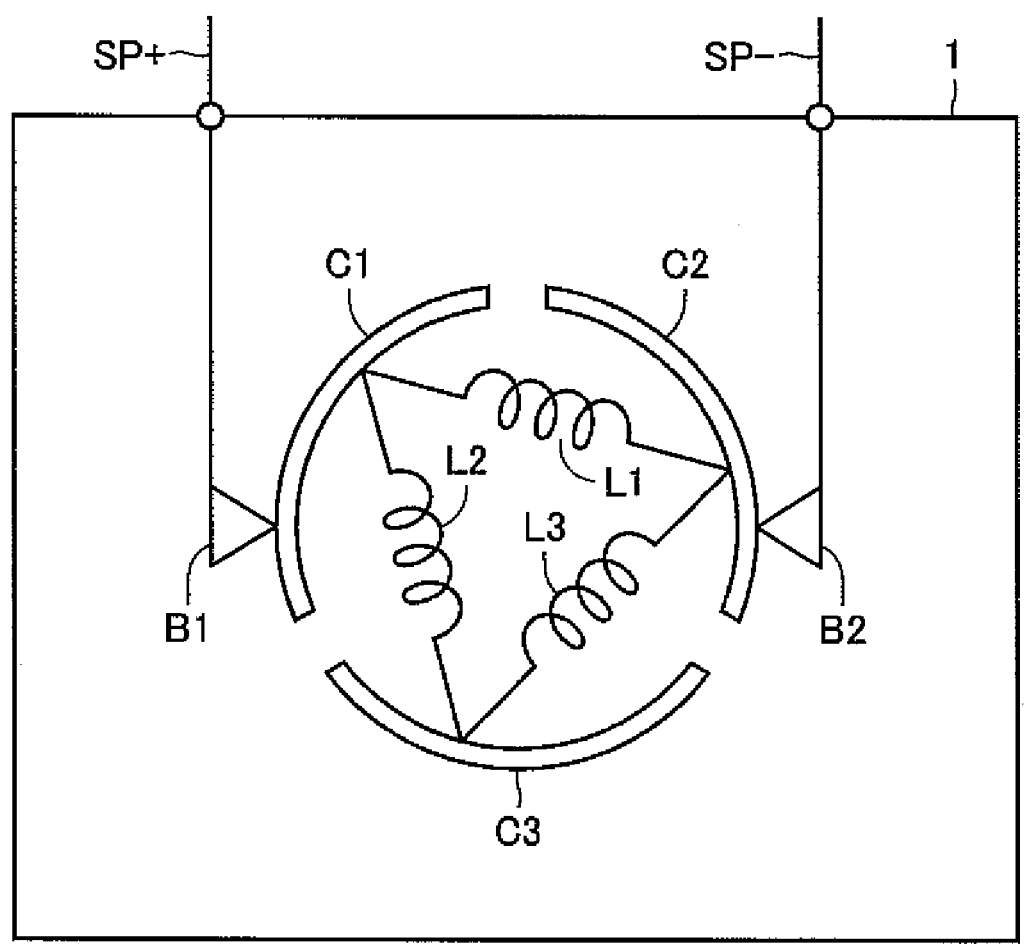
FIG. 3 illustrates a configuration of a spindle motor.

FIG. 3 illustrates a configuration of spindle motor 1.

Referring to FIG. 3, spindle motor 1 is a DC motor, and includes a brush B1 serving as a positive terminal, a brush B2 serving as a negative terminal, commutators C1 to C3, and coils L1 to L3. Brush B1 is connected to first voltage supply line SP+ and brush B2 is connected to second voltage supply line SP−.

When control portion 4 instructs 2V as voltage VREF and 2V as offset voltage Vf, drive IC 2 sets the voltage of first terminal O1 to 3V and sets the voltage of second terminal O2 to 1V. Thus, the voltage of 3V is supplied to brush B1 through first voltage supply line SP+, while the voltage of 1V is supplied to brush B2 through second voltage supply line SP−. Based on a resultant DC voltage of 2V between brush B1 and brush B2, a DC current flows between brush B1 and B2 through a part of commutators C1 to C3 and coils L1 to L3.

When the voltage of first voltage supply line SP+ is greater than that of second voltage supply line SP−, spindle motor 1 receives such torque as causing rotation in a first rotation direction. On the other hand, when the voltage of first voltage supply line SP+ is smaller than that of second voltage supply line SP−, spindle motor 1 receives such torque as causing rotation in a direction opposite to the first rotation direction.

Differential operational amplifier 12 having a non-inverting input terminal connected to first voltage supply line SP+ and an inverting input terminal connected to second voltage supply line SP− amplifies a difference between the voltage of first voltage supply line SP+ and the voltage of second voltage supply line SP− and outputs the amplified voltage difference to failure determination portion 15.

In a normal state, the voltage of first voltage supply line SP+ attains to the voltage set at first terminal O1 of drive IC 2 and the voltage of second voltage supply line SP− attains to the voltage set at second terminal O2 of drive IC2. Therefore, when control portion 4 instructs supply of offset voltage Vf, in the normal state, the voltage difference output by differential operational amplifier 12 attains to a value obtained by multiplying offset voltage Vf instructed by control portion 4 by gain of differential operational amplifier 12.

When brushes B1 and B2 wear, however, debris of the brush is produced. As an amount of debris of the brush introduced between the commutators increases, an electric resistance value between the brushes gradually becomes smaller and short occurs between brushes B1 and B2. In such a case, the voltage difference output by differential operational amplifier 12 becomes smaller than the value obtained by multiplying offset voltage Vf instructed by control portion 4 by gain of differential operational amplifier 12. In a complete short state, the voltage difference output by differential operational amplifier 12 is 0.

Failure determination portion 15 determines occurrence of short of spindle motor 1 based on the voltage difference sent from differential operational amplifier 12. Specifically, when the absolute value of the voltage difference sent from differential operational amplifier 12 is equal to or lower than a prescribed threshold value, failure determination portion 15 determines that spindle motor 1 has shorted out, and when the absolute value of the voltage difference sent from differential operational amplifier 12 exceeds the prescribed threshold value, it determines that spindle motor 1 has not shorted out.

When failure determination portion 15 determines that spindle motor 1 has shorted out, control portion 4 displays as such, and after 30 seconds, control portion 4 turns off the power supply of disk apparatus 101.

(Operation)

Figure 4:
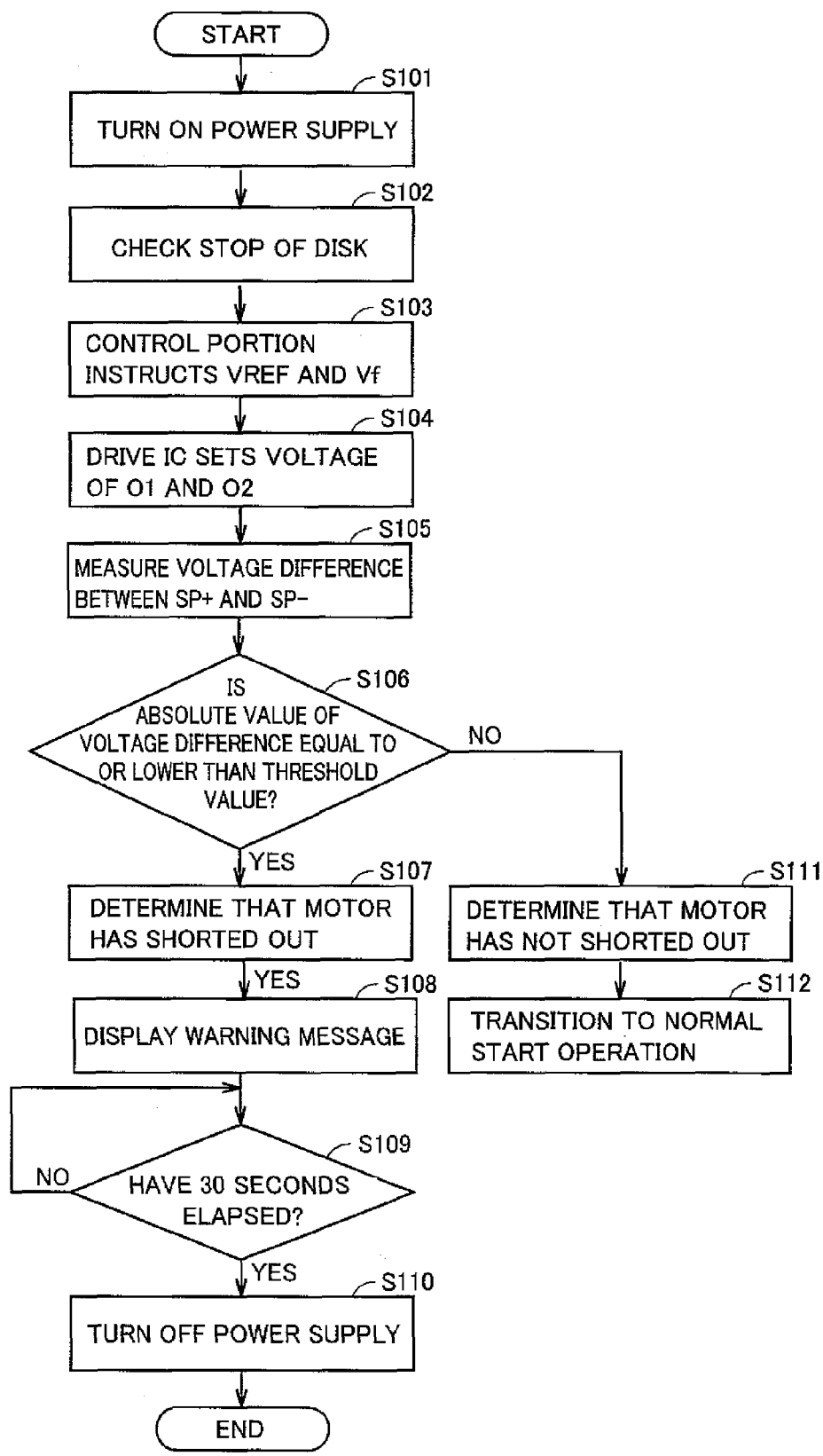
FIG. 4 is a flowchart showing an operation procedure for determining short of the spindle motor in the disk apparatus in the embodiment of the present invention.

FIG. 4 is a flowchart showing an operation procedure for determining short of the spindle motor in the disk apparatus in the embodiment of the present invention.

Referring to FIG. 4, initially, the power supply of disk apparatus 101 is turned on (step S101).

Thereafter, at the time of start, control portion 4 checks whether disk 200 remains stopped or not based on the signal representing the rotation speed of disk 200 output from signal processing portion 14 (step S102).

Thereafter, while disk 200 remains stopped at the time of start, control portion 4 gives a notice of voltage VREF which is a reference voltage and instructs supply of offset voltage Vf representing deviation from the reference voltage for driving spindle motor 1 (step S103).

Figure 5A:
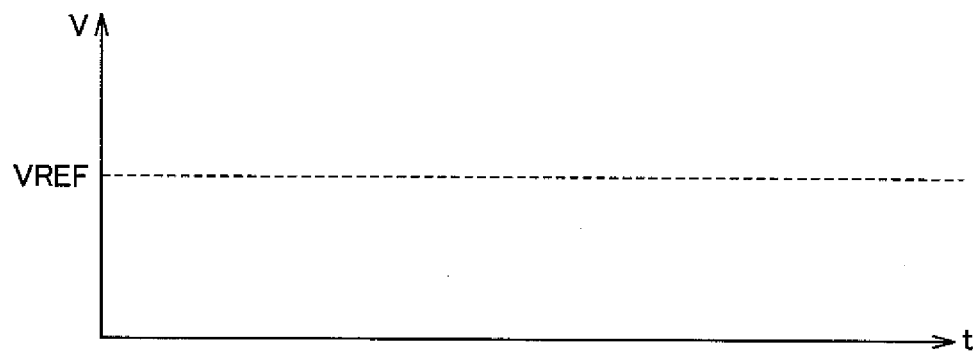
FIG. 5A illustrates a reference voltage notified of the drive IC by the control portion while the disk remains stopped at the time of start.

FIG. 5A illustrates voltage VREF notified of drive IC 2 by control portion 4 while disk 200 remains stopped at the time of start.

Figure 5B:
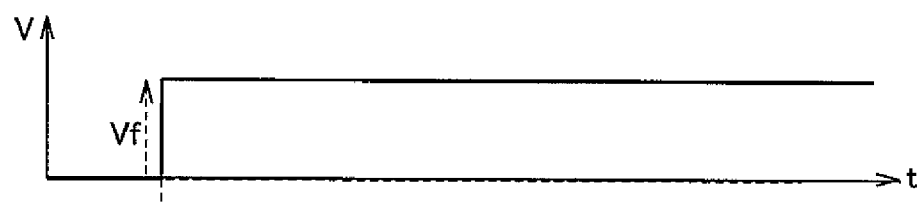
FIG. 5B illustrates an offset voltage of which supply is instructed to the drive IC by the control portion while the disk remains stopped at the time of start.

FIG. 5B illustrates offset voltage Vf of which supply is instructed to drive IC 2 by control portion 4 while disk 200 remains stopped at the time of start.

Thereafter, drive IC 2 sets voltages of first terminal O1 and second terminal O2 based on voltage VREF and offset voltage Vf instructed by control portion 4. Specifically, a voltage obtained by adding a voltage resulting from dividing offset voltage Vf into half to voltage VREF is set for first terminal O1, and a voltage obtained by subtracting a voltage resulting from dividing offset voltage Vf into half from voltage VREF is set for second terminal O2 (step S104).

Figure 5C:
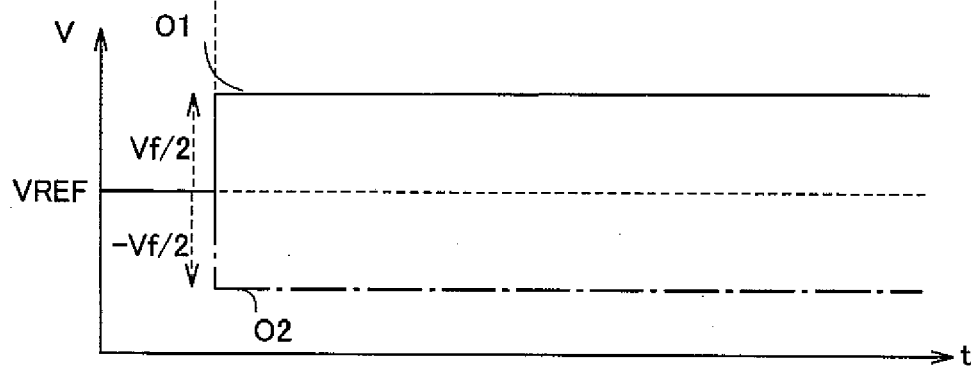
FIG. 5C illustrates voltages set at the first terminal and the second terminal of the drive IC when the reference voltage in FIG. 5A and the offset voltage in FIG. 5B are instructed.

FIG. 5C illustrates voltages set at first terminal O1 and second terminal O2 of drive IC 2 when voltage VREF in FIG. 5A and offset voltage Vf in FIG. 5B are instructed.

Thereafter, differential operational amplifier 12 amplifies the difference between the voltage of first voltage supply line SP+ and the voltage of second voltage supply line SP− and outputs the amplified voltage difference to failure determination portion 15 (step S105).

Thereafter, when the absolute value of the voltage difference sent from differential operational amplifier 12 is equal to or lower than a prescribed threshold value (YES in step S106), failure determination portion 15 determines that spindle motor 1 has shorted out (step S107).

Figure 6A:
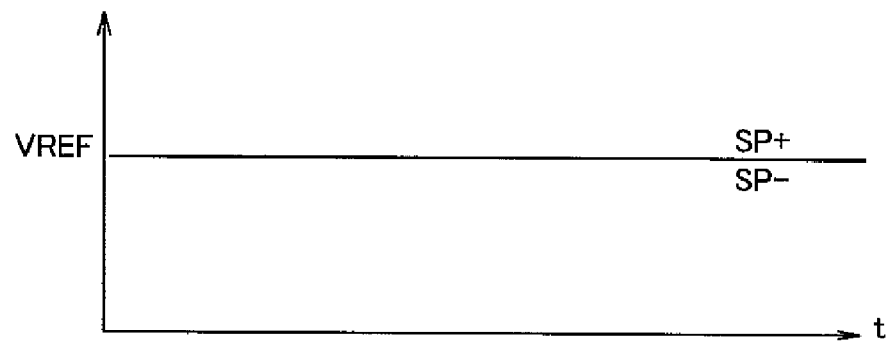
FIG. 6A illustrates a voltage of a first voltage supply line and a voltage of a second voltage supply line when the spindle motor has completely shorted out.

FIG. 6A illustrates a voltage of first voltage supply line SP+ and a voltage of second voltage supply line SP− when spindle motor 1 has completely shorted out.

Thereafter, when failure determination portion 15 determines that spindle motor 1 has shorted out, control portion 4 displays a warning message that spindle motor 1 has shorted out on a not-shown television (step S108).

In addition, after 30 seconds (YES in step S109), control portion 4 turns off the power supply of disk apparatus 101 (step S110).

On the other hand, when the absolute value of the voltage difference sent from differential operational amplifier 12 exceeds the prescribed threshold value (NO in step S106), failure determination portion 15 determines that spindle motor 1 has not shorted out (step S111).

Figure 6B:
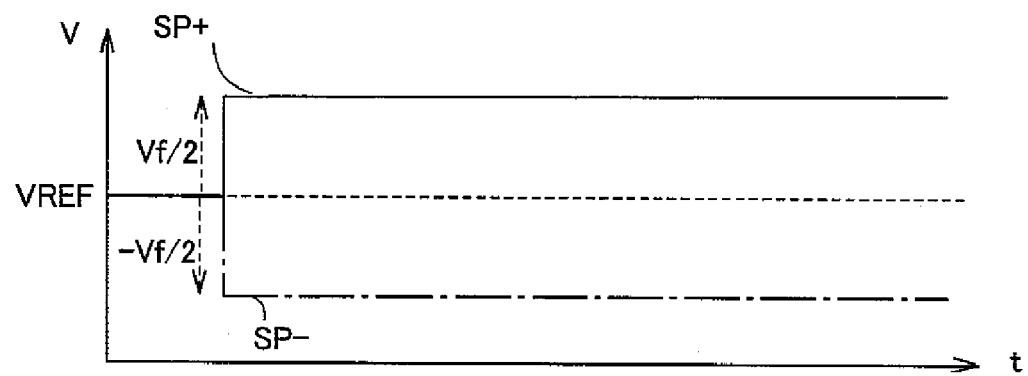
FIG. 6B illustrates a voltage of the first voltage supply line and a voltage of the second voltage supply line when the spindle motor has not shorted out.

FIG. 6B illustrates a voltage of first voltage supply line SP+ and a voltage of second voltage supply line SP− when spindle motor 1 has not shorted out. In FIG. 6B, gain of differential operational amplifier 12 is set to 1.

When failure determination portion 15 determines that spindle motor 1 has not shorted out, control portion 4 causes each portion to perform a normal start operation sequence (step S112).

As described above, according to the disk apparatus of the embodiment of the present invention, differential operational amplifier 12 detects the voltage difference between first voltage supply line SP+ and second voltage supply line SP−, so that occurrence of short of spindle motor 1 can be determined.

(Variation)

The present invention is not limited to the embodiment described above, and for example, the present invention encompasses a variation as follows.

(1) Operation when Short Occurs

In the embodiment of the present invention, when it is determined that spindle motor 1 has shorted out, control portion 4 displays as such, and after 30 seconds, control portion 4 turns off the power supply of disk apparatus 101. The present invention, however, is not limited as such. For example, when it is determined that spindle motor 1 has shorted out, control portion 4 may open a tray for disk 200.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A disk apparatus comprising:
    a DC motor for rotating a disk utilizing a voltage difference generated between a positive terminal and a negative terminal;
    a control portion instructing supply of an offset voltage for driving said DC motor, said control portion instructing supply of said offset voltage while said disk remains stopped at time of start;
    a drive portion having a first terminal connected to said positive terminal via a first voltage supply line and a second terminal connected to said negative terminal via a second voltage supply line and driving said DC motor by applying the offset voltage instructed by said control portion across said first terminal and said second terminal;
    a detector detecting a voltage difference between said first voltage supply line and said second voltage supply line while said disk remains stopped at the time of start; and
    a determination portion determining that said DC motor has shorted out when an absolute value of the voltage difference output by said detector is equal to or lower than a prescribed threshold value, said detector being a differential operational amplifier having a first input terminal connected to said first voltage supply line and a second input terminal connected to said second voltage supply line, and said control portion displaying a warning message with regard to occurrence of a short of the DC motor when it is determined that said DC motor has shorted out, and thereafter turning off a power supply of said disk apparatus.

2. A disk apparatus comprising:
    a DC motor for rotating a disk utilizing a voltage difference generated between a positive terminal and a negative terminal;
    a control portion instructing supply of an offset voltage for driving said DC motor, said control portion instructing supply of said offset voltage while said disk remains stopped at time of start;

a drive portion having a first terminal connected to said positive terminal via a first voltage supply line and a second terminal connected to said negative terminal via a second voltage supply line and driving said DC motor by applying the offset voltage instructed by said control portion across said first terminal and said second terminal;

a detector detecting a voltage difference between said first voltage supply line and said second voltage supply line while said disk remains stopped at the time of start; and a determination portion determining that said DC motor has shorted out when an absolute value of the voltage difference output by said detector is equal to or lower than a prescribed threshold value.

3. The disk apparatus according to claim 2, wherein said detector is a differential operational amplifier having a first input terminal connected to said first voltage supply line and a second input terminal connected to said second voltage supply line.

4. The disk apparatus according to claim 2, wherein said control portion displays a warning message with regard to occurrence of a short of the DC motor when it is determined that said DC motor has shorted out, and thereafter turns off a power supply of said disk apparatus.

* * * * *